United States Patent [19]

Oyamada et al.

[11] Patent Number: 4,807,954
[45] Date of Patent: Feb. 28, 1989

[54] OPTICAL COUPLING DEVICE

[75] Inventors: Kimiyuki Oyamada; Yozo Utsumi, both of Tokyo, Japan

[73] Assignee: Nippon Hoso Kyokai, Tokyo, Japan

[21] Appl. No.: 828,247

[22] Filed: Feb. 11, 1986

[30] Foreign Application Priority Data

Feb. 16, 1985 [JP] Japan .................................. 60-27551

[51] Int. Cl.⁴ ................................................ G02B 6/26
[52] U.S. Cl. .............................. 350/96.15; 350/96.18
[58] Field of Search ................ 350/96.15, 96.18, 96.20

[56] References Cited

U.S. PATENT DOCUMENTS 4,697,867 10/1987 Blanc et al. ......................... 350/96.1

FOREIGN PATENT DOCUMENTS

| 0028055 | 2/1980 | Japan | 350/96.15 |
| 0029886 | 3/1980 | Japan | 350/96.16 |
| 0226310 | 12/1984 | Japan | 350/96.15 |
| 2116742A | 9/1983 | United Kingdom . | |

OTHER PUBLICATIONS

Patent Abstracts of Japan, vol. 1, No. 52 (E-76), 20 May 1977, p. 3512 E 76; 1 JP-A-51 149034 12-21-76.
Patent Abstracts of Japan, vol. 2, No. 130 (E-78), 28 Oct. 1978, p. 7906 E 78; 1 JP-A-53 97 446, 8-25-78.
Applied Optics, vol. 19, No. 14, 15 Jul. 1980, pp. 2453-2456, "Beam-to-Fiber Coupling with Low Studing Wave Ratio," Rulrich et al.

Primary Examiner—John D. Lee
Assistant Examiner—John Ngo
Attorney, Agent, or Firm—Saidman, Sterne, Kessler & Goldstein

[57] ABSTRACT

An output light beam from a semiconductor laser is converged by a lens system or a fine optical fiber with a small core diameter. The converged light beam is incident upon a part of the light receiving end face of a tapered optical fiber which is greater in area than the other end face thereof which is connected to one end of an optical fiber. The reflected light beam in the multimode optical fiber because of discontinuous portion is substantially prevented from returning to the semiconductor laser, so that the adverse effects on the semiconductor laser by the reflected beam can be minimized.

12 Claims, 5 Drawing Sheets

OPTICAL COUPLING DEVICE

BACKGROUND OF THE INVENTION

1. Field of the Invention

The present invention relates to an optical coupling device for coupling an output beam from a semiconductor laser to an optical fiber.

2. Description of the Prior Art

In general, in the case that an output beam from a semiconductor laser is coupled to an optical fiber, there is the possibility that a light beam reflected from a discontinuous portion of the optical fiber is incident upon the semiconductor laser. Such an incident light beam adversely affects characteristics such as oscillation, noise and so on of the semiconductor laser.

In order to overcome this problem, the following method can be considered.

(i) An optical fiber is fabricated in such a way that no light beam is reflected from the discontinuous portion of the optical fiber; and (ii) a non-reciprocal element such as an optical isolator is inserted so that the reflected light beam can be prevented from returning to the semiconductor laser.

However, according to the method (i), no satisfactory result can be obtained unless all the discontinuous portions of the optical fiber are fabricated and there is a defect that it becomes difficult to splice the optical fibers after they are fabricated. In addition, according to the method (ii), there is a defect that an optical isolator is expensive.

Therefore, as shown in FIG. 9, there has been devised a method in which the output beam from a semiconductor laser 1 is converged through a lens 2 and incident upon a single-mode optical fiber 3. The output beam from the single-mode optical fiber 3 is incident upon a multi-mode optical fiber 4. As a result, a reflected beam in the multi-mode optical fiber 4 because of discontinuous portion can hardly be incident upon the single-mode optical fiber 3, so that the reflected beam hardly returns through the lens 2 to the semiconductor laser 1. In this case, however, the single-mode optical fiber 3 is used, so that adjustments with a high degree of accuracy are needed to make the laser beam incident upon the single-mode optical fiber 3. Accordingly, a mechanism for such adjustments becomes complicated and expensive.

SUMMARY OF THE INVENTION

In view of the above, a first object of the present invention is to provide an optical coupling device which can substantially eliminate the above-described disadvantages and can reduce the adverse effects on the characteristics of a semiconductor laser due to the light beam reflected form a discontinuous portion of an optical fiber.

A second object of the present invention is to provide an optical coupling device which uses inexpensive component parts and is simple in construction yet can substantially prevent the return of the light beam reflected from the discontinuous portion of the optical fiber to a semiconductor laser.

In the first aspect of the present invention, an optical coupling device of the type for coupling an output beam from a semiconductor laser to an optical fiber, comprises:

a first optical member for converging the output beam from the semiconductor laser; and a second optical member having a light receiving end face, a part of which receives the converged light beam from the first optical member and a coupling end face coupled to the optical fiber, and an area of the light receiving end face being larger than that of the coupling end face.

Here, the coupling end face may have a core area equal to or less than the core area of the optical fiber.

The second optical member may be in the form of a tapered optical fiber or may be formed integral with the optical fiber.

The first optical member may be formed by a converging lens system or may be a fine optical fiber having a small core diameter.

In the second aspect of the present invention, an optical coupling device of the type for coupling an output beam from a plurality of semiconductor lasers to an optical fiber, comprises:

a plurality of first optical members for converging the respective output beams from the semiconductor lasers; and a second optical member having a light receiving end face, a part of which receives the converged light beams from the first optical members at different locations of the light receiving end face and a coupling end face coupled to the optical fiber, and an area of the light receiving end face being larger than that of the coupling end face.

Here, the coupling end face may have a core area equal to or less than the core area of the optical fiber.

The second optical member may be in the form of a tapered optical fiber or may be formed integral with the optical fiber.

Each of the first optical members may be formed by a converging lens system or may be a fine optical fiber having a small core diameter.

The above and other objects, effects features and advantages of the present invention will become more apparent from the following description of preferred embodiments thereof taken in conjunction with the accompanying drawings.

DETAILED DESCRIPTION OF PREFERRED EMBODIMENTS

Figure 1:
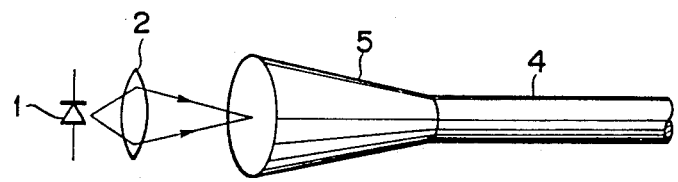
FIG. 1 is a perspective view showing an embodiment of an optical coupling device in accordance with the present invention.
Figure 2:
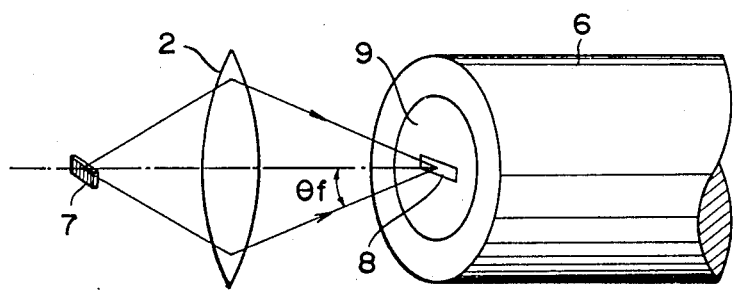
FIG. 2 is a perspective view used to explain the mode of operation thereof.

Referring first to FIGS. 1 and 2, a first embodiment of the present invention will be described. In the first embodiment, one end of a multi-mode optical fiber 4 is connected to one end of a tapered optical fiber 5. The tapered optical fiber 5 is tapered in such a way that the core diameter of its one end or beam output end connected to the multi-mode optical fiber 4 is made substantially equal to or less than the core diameter of the multi-mode optical fiber 4 while the core diameter of the other end or input end of the tapered optical fiber 5 which receives the beam from a semiconductor laser 1 is made sufficiently larger than the real image of a light emitting region of the semiconductor laser 1 focused on the input end face of the tapered optical fiber 5.

The tapered optical fiber 5 is not limited to a frusto-conical optical fiber as shown in FIG. 1 and may be a tapered optical fiber which is formed as a waveguide on a substrate and has a square or semicircular cross section. In addition, according to the present invention, it suffices to determine the core diameters at both ends of the tapered optical fiber in the manner described above, so that instead of the straight and tapered optical fiber as shown in FIG. 1, a curved and tapered optical fiber may be used. The tapered optical fiber 5 and the multi-mode optical fiber 4 can be securely bonded or fused together or can be coupled to each other through a suitable optical connector.

The output beam from the semiconductor laser 1 is converged by the lens 2 and is incident upon the tapered optical fiber 5. The laser beam propagates through the tapered optical fiber 5 and is directed to the multi-mode optical fiber 4 to propagate therethrough. The reflected beam in the multi-mode optical fiber 4 is incident upon the tapered optical fiber 5, through which the reflected beam propagates in the reversed direction. Part of the reflected beam is incident again upon the semiconductor laser 1. In order to minimize the adverse effects of such reflected beam on the semiconductor laser 1, it is preferable that only the coupling efficiency (to be referred to as "the reverse direction coupling efficiency" hereinafter in this specification) from the multi-mode optical fiber 4 to the semiconductor laser 1 is decreased without decreasing the coupling efficiency (to be referred to as "the forward direction coupling efficiency" hereinafter in this specification) from the semiconductor laser 1 to the multi-mode optical fiber 4.

Such phenomenon as described above can be attained by an optical coupling device in accordance with the present invention, which will be described in detail below.

First, for the sake of simplifying explanations, it is assumed that an optical fiber 6 has the same cross section throughout its length as shown in FIG. 2, instead of the tapered optical fiber 5. The maximum forward direction coupling efficiency can be obtained when the real image 8 of the light emitting region 7 of the semiconductor laser 1 is focused through the lens 2 on the beam input end face of the optical fiber 6. In general, the size of the image 8 is enlarged as large as the diameter of a core 9 of the optical fiber 6 so that the maximum incidence angle $\theta_f$ to the optical fiber 6 is decreased. In accordance with the present invention, however, in order to reduce the reverse direction coupling efficiency as will be described in detail below, the size of the image 8 is maintained small as long as $\theta_f$ will not exceed an allowable incidence angle $\theta_c$ of the optical fiber 6.

The reason why $\theta$ is not allowed to increase in excess of the allowable incidence angle $\theta_c$ is as follows. When the light beam is incident at an angle less than $\theta_c$, the incident light beam propagates through the optical fiber 6. On the other hand, when the light beam is incident upon the core 9 at an angle greater than $\theta_c$, the incident light beam is radiated exterior of the optical fiber 6.

Next, the reverse direction coupling efficiency is discussed. Of the light beams directed from the optical fiber 6 to the semiconductor laser 1, only light beams which cross the real image 8 of the semiconductor laser 1 at the end face of the optical fiber 6 actually reaches the light emitting region 7 of the semiconductor laser 1. The remaining light beams which pass other portions would not reach the light emitting region 7 of the semiconductor laser 1. It follows, therefore, the ratio of light beams passing through the real image 8 of the light emitting region 7 of the semiconductor laser 1 to the light beams passing through the end face of the optical fiber 6 corresponds to a reverse direction coupling efficiency.

For instance, it is assumed that the optical fiber 6 has a uniform refractive index core. Then, it is considered that the light intensity distribution at the end face of the optical fiber 6 is uniform within the core 9. Therefore, the reverse direction coupling efficiency $\eta_r$ is given by $$\eta_r = S_1/S_2$$

where $S_1$: the area of the real image 8 of the light emitting region 7 of the semiconductor laser 1, and $S_2$: the area of the core 9.

Therefore, in order to minimize the reverse direction coupling efficiency, the real image 8 of the light emitting region of the semiconductor laser 1 should be decreased, or the diameter of the core 9 of the optical fiber 6 should be increased. The former method is limited because of aberrations of an optical system. In the latter method, most of multi-mode optical fibers are 50 to 80 $\mu$m in core diameter, so that there arises a problem when an optical fiber having a core diameter other than a usual one is connected to other optical fibers and devices. However, according to the present invention, the tapered optical fiber 5 is connected to the input end of the multi-mode optical fiber 4 in the manner described above, so that the core at the input end of the tapered optical fiber 5 can be increased in diameter. As a result, the reverse direction coupling efficiency can be minimized.

Figure 3A:
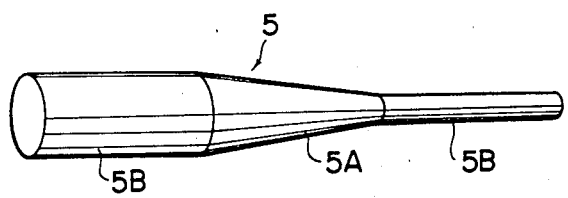
FIGS. 3A-3C are perspective views each showing a modification of an optical coupling device in accordance with the present invention.
Figure 3B:
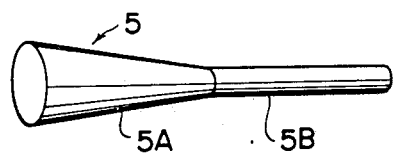
Figure 3C:
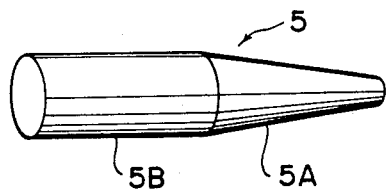

The tapered optical fiber 5 may be modified as shown in FIGS. 3A-3C. For instance, as shown in FIG. 3A, the tapered optical fiber 5 may consist of a tapered portion 5A and portions 5B which are connected to the respective ends of the tapered portion 5A and each of which has the same cross sectional area throughout its length. Alternatively, as shown in FIGS. 3B-3C, the tapered optical fiber 5 may consist of a tapered portion 5A and a portion 5B which is connected to one end of the tapered portion 5A and has the same cross sectional area throughout its length.

Figure 4:
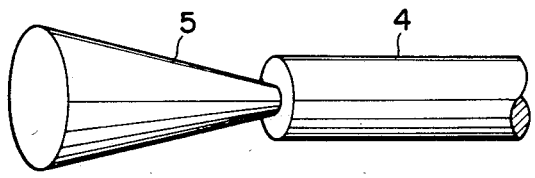
FIG. 4 is a perspective view showing another embodiment of the present invention.
Figure 9:
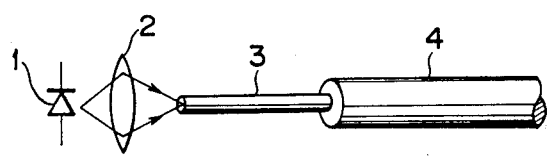
FIG. 9 is a perspective view showing a prior art optical coupling device.

Furthermore, as shown in FIG. 4, the core diameter of one end of the tapered optical fiber 5 connected to the multi-mode optical fiber 4 may be smaller than the core diameter of the multi-mode optical fiber 4. In this case, the connection portion between the optical fibers 4 and 5 is similar to that between the optical fibers 3 and 4 shown in FIG. 9, so that the forward direction coupling efficiency can be different from the reverse direction coupling efficiency in this connection portion. In this manner, the adverse effects of the reflected beams can be further reduced.

Figure 5A:
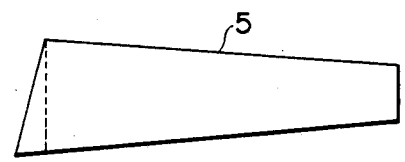
FIGS. 5A-5C are side views each showing a modification of an optical coupling device in accordance with the present invention.
Figure 5B:
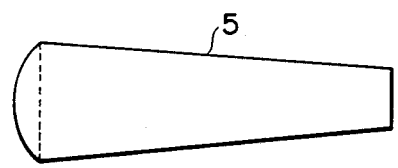
Figure 5C:
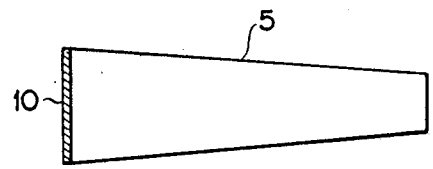

Furthermore, even in the present invention, the beam reflected back from the input end face of the tapered optical fiber 5 should be prevented from being incident upon the semiconductor laser 1. For that purpose, the methods employed in the conventional optical coupling devices may be used as shown in FIGS. 5A–5C. For instance, the input end of the tapered optical fiber 5 can be inclined at an angle, as shown in FIG. 5A. The input end can be formed to have a spherical surface, as shown in FIG. 5B. Alternatively, a non-reflecting coating 10 can be applied to the input end face of the tapered optical fiber 5, as shown in FIG. 5C.

Figure 6:
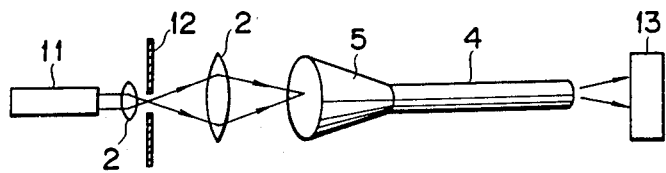
FIGS. 6 and 7 are schematic diagrams illustrating measuring systems, respectively, used for measuring a forward direction coupling efficiency and a reverse direction coupling efficiency.
Figure 7:
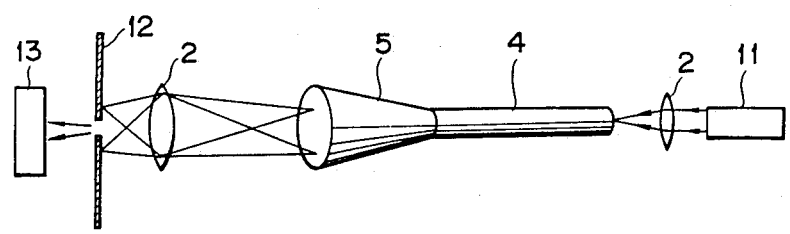

According to the present invention, a tapered optical fiber having a core diameter of 125 μm at one end and a core diameter of 50 μm at the other end was fabricated. The forward direction coupling efficiency and the reverse direction coupling efficiency of the tapered optical fiber as an optical coupling device were measured. In this case, the measuring systems as shown in FIGS. 6 and 7 were used for measuring the forward and reverse direction coupling efficiency, respectively. In FIGS. 6 and 7, reference numerals 2, 4 and 5 denote a lens, a multi-mode optical fiber and a tapered optical fiber like in FIGS. 1–5. In these measuring systems, instead of a semiconductor laser, an He-Ne laser 11 was used as a light source and instead of the light emitting region of the semiconductor laser, a pinhole 12 having a pinhole diameter of 10 μm was used. Reference numeral 13 designates an optical power meter. The measurements showed that the forward direction coupling efficiency was −4 dB while the reverse direction coupling efficiency was −25 dB.

Figure 8:
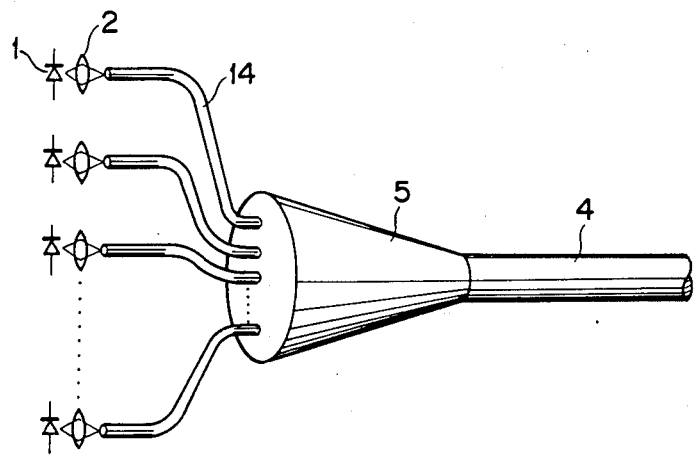
FIG. 8 is a perspective view showing a further embodiment of an optical coupling device in accordance with the present invention.

FIG. 8 shows a further embodiment of an optical coupling device in accordance with the present invention, in which a plurality of fine optical fibers 14 having a small core diameter are so arranged to make the light beams directly incident upon a single tapered optical fiber 5. The core diameter of the input end of the tapered optical fiber 5 is made sufficiently larger than the core diameter of the fine optical fibers 14 interposed between the tapered optical fiber 5 and the semiconductor lasers 1, so that it becomes possible to connect a plurality of fine optical fibers 14 in common to the input end face of the tapered optical fiber 5 in such a way that they have substantially the same forward direction coupling efficiency. That is, in the embodiment as shown in FIG. 8, the reverse direction coupling efficiency can be remarkably decreased, as compared with the forward direction coupling efficiency, when the plural light beams from the respective semiconductor lasers 1 are optically coupled to the multimode optical fiber 4.

According to the present invention, a specially fabricated component part such as optical isolator is not used, so that the optical coupling device can be arranged at low cost. It should be especially noted that the tapered optical fiber to be used in the present invention can be made of the same materials with those of the conventional optical fiber and it is not required to fabricate the tapered optical fiber with a high degree of accuracy. Moreover, the light input end face is large in diameter, so that the assembly can be adjusted easily.

What is claimed is:

1. An optical coupling device to be used for light communication of purpose of the type for coupling an output light beam from a semiconductor laser to be used for light communication purpose to an optical fiber having a core of predetermined area, said optical fiber being a light communication purpose optical fiber for transmitting information, a reverse light beam generated on the downstream side of said optical fiber and propagating through said core toward said semiconductor laser, said optical coupling device comprising:

a first optical member for imaging the output light beam from said semiconductor laser; and a second optical member having a core, a light receiving end face, on which the image of the light beam from said first optical member falls, an incidence angle $\theta f$ the imaged light beam from said first optical member to said light receiving end face of said second optical member being set to an incidence angle $\theta f$ which does not exceed an allowable incidence angle $\theta c$ at which said imaged light beam can transmit through said second optical member, so that an area of said imaged light beam from said first optical member on said end face is made as small as possible, and a coupling end face coupled to said optical fiber, wherein the area of the core of said second optical member at said coupling end face is equal to or less than the area of the core of said optical fiber, and is less than the area of the core of said second optical member at said light receiving end face.

2. An optical coupling device as claimed in claim 1, wherein said second optical member is in the form of a tapered optical fiber.

3. An optical coupling device as claimed in claim 2, wherein said second optical member is formed integral with said optical fiber.

4. An optical coupling device as claimed in claim 1, wherein said second optical member is formed integral with said optical fiber.

5. An optical coupling device as claimed in claim I, wherein said first optical member comprises a converging lens system.

6. An optical coupling device as claimed in claim 5, wherein said first optical member further comprises a fine optical fiber of core diameter less than the area of the core of said second optical member at said light receiving end face.

7. An optical coupling device to be used for light communication purpose of the type for coupling output light beams from a plurality of semicondcutor lasers to be used for light communication purpose to an optical fiber having a core of predetermined area, said optical fiber being a light communication purpose optical fiber for transmitting information, a reverse light beam generated on the downstream side of said optical fiber and propagating through said core toward said semiconductor lasers, said optical coupling device comprising:

a plurality of first optical members for imaging the respective output light beams from said semiconductor lasers; and a second optical member having a core, a light receiving end face, on which the images of the light beams from said first optical members fall at different locations, an incidence angle $\theta f$ of each of the imaged light beams from said first optical members to said light receiving end face of said second optical member being set to an incidence angle $\theta f$ which does not exceed an allowable incidence angle $\theta c$ at which each of said imaged light beams can transmit through said second optical member so that an area of each of said imaged light beams from said first optical members on said end face is made as small as possible, and a coupling end face coupled to said optical fiber, wherein the area of said core at said light receiving end face is larger than that of said core at said coupling end face, and wherein the area of said core at said coupling end face is less than or equal to the area of the core of said optical fiber.

8. An optical coupling device as claimed in claim wherein said second optical member is in the form of a tapered optical fiber.

9. An optical coupling device as claimed in claim 8, wherein said second optical member is formed integral with said optical fiber.

10. An optical coupling device as claimed in claim 7, wherein said second optical member is formed integral with said optical fiber.

11. An optical coupling device as claimed in claim 7, wherein each of said first optical members comprises a conversion lense system and a fine optical fiber having a core diameter of less than the area of the core of said second optical member at said light receiving end face.

12. An optical coupling device as claimed in claim 7, wherein each of said first optical members comprises a converging lens system.

* * * * *